United States Patent [19] | [11] Patent Number: 4,595,162
Matsumura et al. | [45] Date of Patent: Jun. 17, 1986

[54] DEVICE FOR CLAMPING A TUBULAR MEMBER

[75] Inventors: Takahiro Matsumura, Kobe; Yoshiharu Inui, Takarazuka, both of Japan

[73] Assignees: Kawasaki Jukogyo Kabushiki Kaisha; Sumitomo Gomu Kogyo Kabushiki Kaisha, both of Kobe, Japan

[21] Appl. No.: 598,680

[22] Filed: Apr. 10, 1984

[30] Foreign Application Priority Data

Apr. 15, 1983 [JP] Japan ................. 58-55469

[51] Int. Cl.⁴ ............................. F16L 3/22
[52] U.S. Cl. ................. 248/68.1; 248/67.5
[58] Field of Search .......... 248/68.1, 67.5, 67.7, 248/74.4, 74.5, 74.1, 65, 79, 74.2, 231.1, 231.9, 903; 24/284, 282, 459; 285/373, 415

[56] References Cited

U.S. PATENT DOCUMENTS 1,785,314 12/1930 Kelly ................. 24/284
1,905,324 4/1933 Waters ............... 285/373
1,930,194 10/1933 Dillon ............... 285/373
2,225,208 12/1940 Crickmer ............ 285/373
2,288,158 6/1942 Ellinwood ........... 248/67.5
2,355,165 8/1944 Jerman .............. 24/284
2,417,741 3/1947 Dillon ............... 285/373
3,232,569 2/1966 Deardorf ............ 248/74.1
3,245,643 4/1966 Morrow ............. 248/68.1
3,375,856 4/1968 Howard et al. ...... 248/68.1
3,385,545 5/1968 Patton .............. 248/68.1
4,471,979 9/1984 Gibb et al. ......... 285/415

FOREIGN PATENT DOCUMENTS 0781479 11/1980 U.S.S.R. ........... 248/68.1

Primary Examiner—Ramon S. Britts
Assistant Examiner—Ramon O. Ramirez
Attorney, Agent, or Firm—Leydig, Voit & Mayer, Ltd.

[57] ABSTRACT

The invention relates to a clamping device including a pair of recessed semicylindrical resilient gripping bodies each embedded with a resilient member of harder material than the gripping bodies. The cross section of each resilient member is shaped like a semicircle having flanges at its both side edges, respectively. The diameter of the semicircle is the greatest at the midpoint of a center axis of the reinforcing member and becomes smaller toward the ends thereof. A tubular member is securely clamped inside the recesses and between these bone members by connecting means.

3 Claims, 9 Drawing Figures

DEVICE FOR CLAMPING A TUBULAR MEMBER

BACKGROUND OF THE INVENTION

The present invention relates to a device for clamping a tubular member equipped, mainly, to a vehicle, such as, for example, an electric wire or pipe.

A vehicle is generally equipped with electric appliances together with electric wires and tubes or pipes associated therewith. Such wires or tubes are required to be fixed to a base frame of a vehicle body against the vibrations.

Conventionally, as shown in FIG. 1, electric wires or pipes 2 are clamped by a pair of clamping members 1 which are fastened with fastening parts 3 such as bolts and nuts to each other and, for example, a bracket A attached onto the base frame of the vehicle body.

However, such clamping members 1 are formed of nonelastic material such as, for example, hard wood, synthetic resin, etc. and have the following drawbacks:

(1) that they are bulky and heavy;
(2) that the fastening bolts are elongate and large resulting in a low working efficiency
(3) that the clamping or hole portions of the clamping members for receiving the tubular members have no flexibility or resiliency, so that it is necessary to make the diameters of the hole portions to be brought exactly into conformity with the outer diameters of the tubular members in order to obtain a reliable clamping; and that, further, the hole portions are required to be smoothed, for example, chamfered so as not to cause damages to the tubular member. And,
(4) that the force with which the tubular member is clamped tends to become excessive, so that the clamping members may injure a coating thereof.

SUMMARY OF THE INVENTION

It is, therefore, an object of the present invention to eliminate the above-mentioned drawbacks and provides a device for clamping a tubular member which is small in size and light in weight yet capable of exerting strong clamping pressure.

It is another object of the present invention to provide a device for clamping tubular members which is adapted to receive members of slightly different size and does not require an exact fit of members for proper functioning.

BRIEF DESCRIPTION OF THE DRAWINGS

Other and further objects, features and advantages of the invention will appear be more clearly understood from the following detailed description taken in conjunction with the accompanying drawings, in which.

DETAILED DESCRIPTION OF THE PREFERRED EMBODIMENTS

Figure 1:
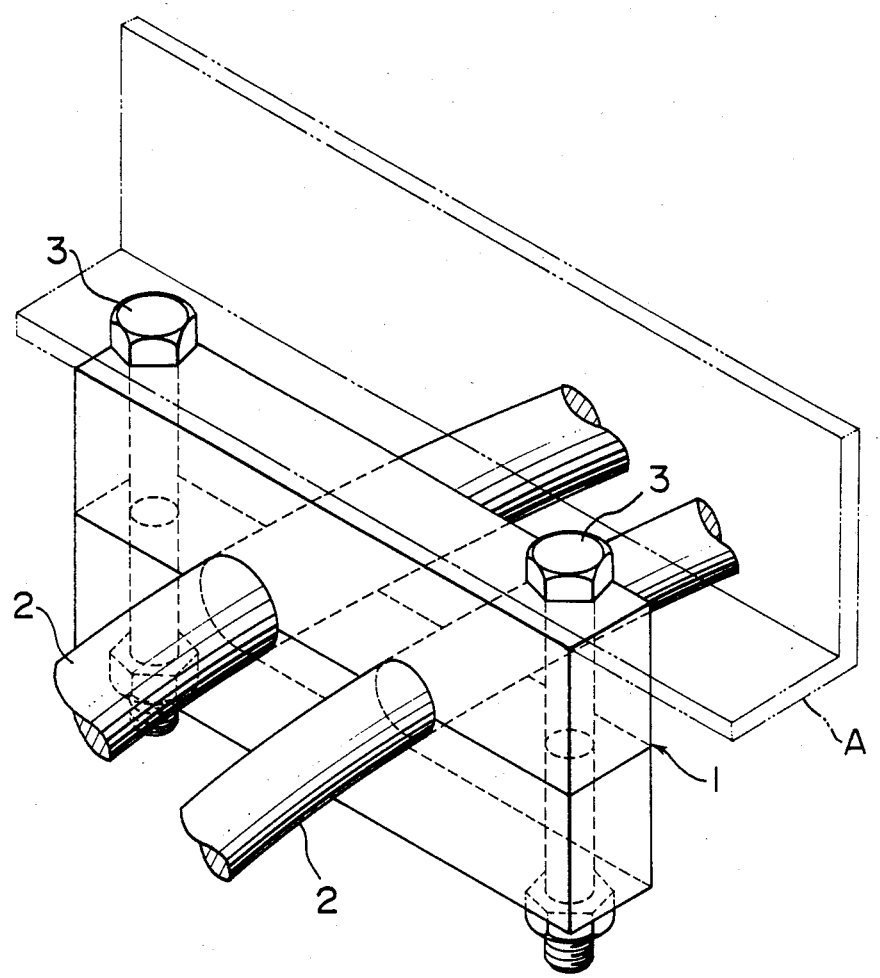
FIG. 1. is a perspective view showing a conventional device for clamping tubular members.
Figure 2A:
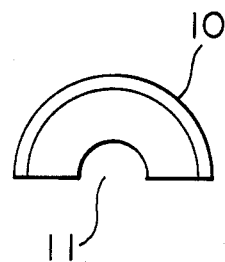
FIGS. 2a and 2b are a front view and a side view, respectively, of a gripping body of the present invention.
Figure 2B:
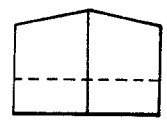

The present invention will now be described with reference to the embodiments shown in FIGS. 2a and 2b, FIGS. 3a and 3b, and FIGS. 4a and 4b of the drawings. As can be seen in FIGS. 2a and 2b, a gripping body 10 of resilient material such as rubber has a semicylindrical shape, and two such bodies together provide a cylindrical member divided into two equal parts by a plane including a center axis thereof.

Figure 3A:
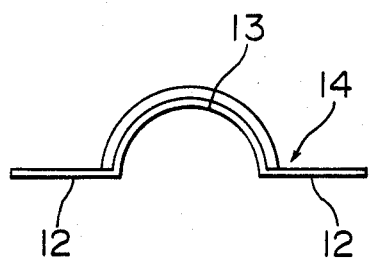
FIGS. 3a and 3b are a front view and a side view, respectively, of a bone member of the present invention.
Figure 3B:
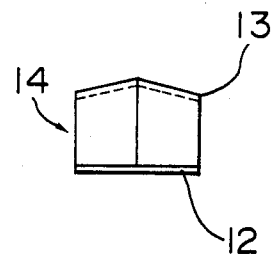

A concentric cylindrical recess 14 formed in the gripping body 10 extends along the center axis and receives a tubular member 2 to be clamped. As shown in FIGS. 3a, and 3b, the bone member 14 is formed into a bulged semicylindrical shape having fillet-like side flanges 12 integrally extending radially outwardly from both side edges thereof. The semicylindrical bone member is concentric with the center axis of the body 10 and has the greatest radius therefrom at a midpoint taken axially and the smallest radius at a point furthest from that midpoint in both axial directions.

Figure 4A:
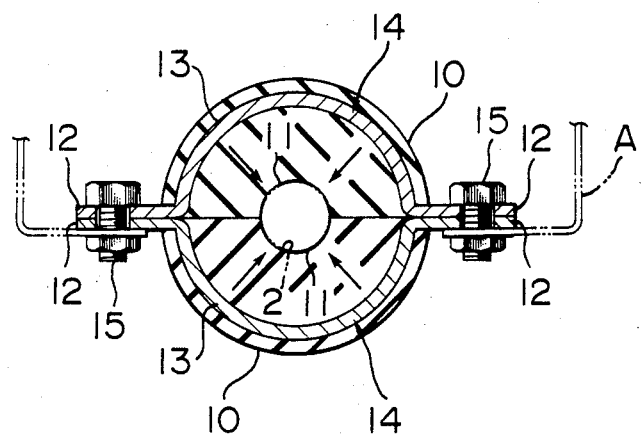
FIGS. 4a and 4b are a cross-sectional view and a longitudinal-sectional view, respectively, of a device assembled according to the present invention.
Figure 4B:
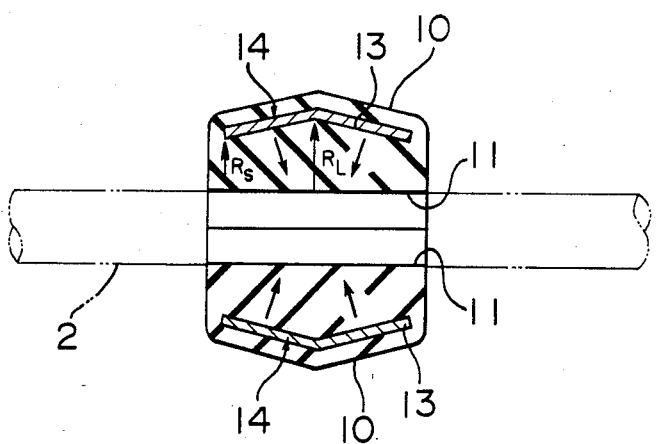

The manner of using the above-described clamping device can be explained with reference to FIGS. 4a and 4b which illustrate an embodiment of the invention in which a semicylindrical portion of each bone member 14 is embedded in a resilient gripping body 10. First, the tubular member 2 is clamped, from both sides, by the surfaces of the recess 11, and these surfaces are brought into contact with the outer surface of the tubular member 2. Thereafter, the device is fixed, at its flanges 12, to a bracket A by the use of bolts and nuts 15 as shown in FIG. 4a. If, in this case, the diameter of the recess 11 is somewhat smaller than the diameter of the tubular member 2, then a centripetal fastening force will work on the tubular member 2 as shown by arrows. Consequently, the force acting on the tubular member 2 is quite uniform and not excessive. Further, if the semicylindrical bone portion 13 is so formed that its central part bulges, as shown, then a fastening force will act toward a midpoint of the tubular member 2, preventing the gripping body 10 from shearing deformation which may cause a reduction in the fastening force.

Figure 5:
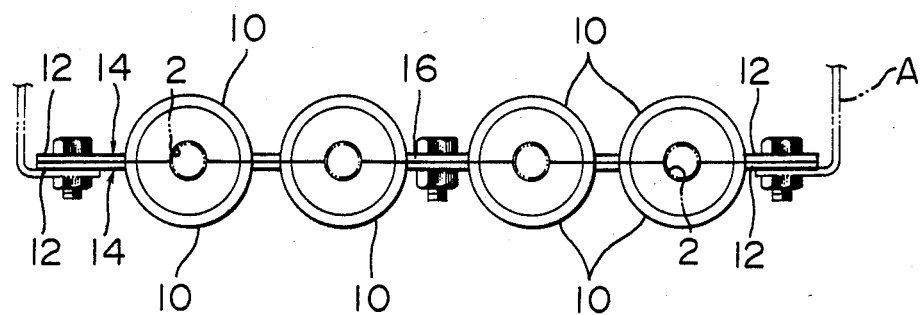
FIGS. 5 and 6 are schematic views for explaining further examples of the present invention.
Figure 6:
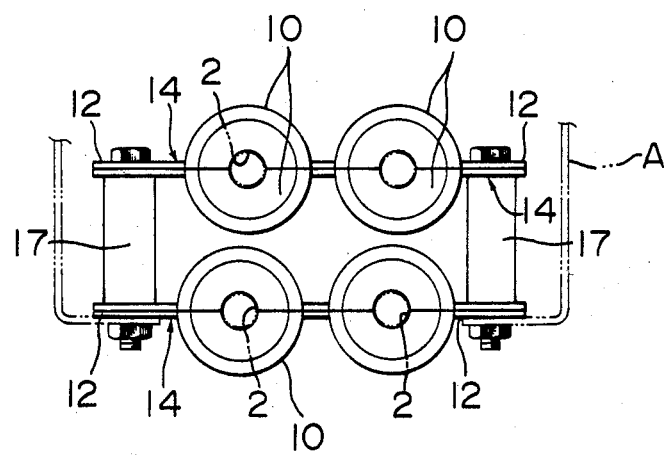

Further in accordance with the invention, it is also possible to integrally join together a plurality of adjacent bone members 14 and to fasten the joined bone members with each other at an intermediate position 16 thereof as shown in FIG. 5. Further, it is also possible with readiness to use the parallel-arranged devices in a manner that they are piled up in two or more stages with a spacer 17 interposed therebetween, as shown in FIG. 6.

As can be recognized, since the device for gripping the tubular member is molded from resilient material, it is possible to produce the device on a mass-production basis, and thereby reduce the manufacturing cost and easily control the device precision. Furthermore, the device can be made small in size and light in weight for easy handling. Further, short size of bolts can be used as fixing bolts. In addition, since the recess brought into contact with the tubular member consists of resilient material, even when the diameter of the tubular member is varied, the device can absorb such variation to a certain extent and, at the same time, the precision with which these recesses are fabricated is not required to be so high. Also, the fastening force uniformly acts on the tubular member, and thereby prevents any deforming or shearing damages to a coating of the tubular member caused by non-uniform force. Furthermore, the different parts of the device, i.e., gripping bodies, bone members, etcetera, can be separated highly conveniently for storage or transportation. Accordingly, it is clearly seen that the device of the present invention has a high practical value.

Having described a specific embodiment of our bearing, it is believed obvious that modification and variation of our invention is possible in light of the above teachings.

What is claimed is:

1. A device for clamping a tubular member comprising:
    a pair of gripping bodies formed of resilient material, each body being a semicylindrical body with a concentric semicylindrical recess extending along a center axis of the cylinder, said recess being used for partly receiving the tubular member,
    a pair of reinforcing members formed of a harder material than that of said gripping bodies, each member being a bulged semicylinder having fillet-like side flanges integrally extending from both side edges of said bulged semicylinder radially outwardly thereof, respectively, said bulged semicylinder being concentric with said axis and having a portion of greatest radius therefrom at a midpoint taken axially of the semicylinder and portions of a smallest radius therefrom at points furthest from said midpoint in both axial directions, said reinforcing member being partly embedded in said semicylindrical gripping body in concentric relation therewith, and
    means for connecting said pair of reinforcing members to each other with said tubular member clamped therebetween.

2. A device for clamping a tubular member comprising:
    a pair of gripping bodies formed of resilient material, each body having a semicylindrical shape and said bodies together forming a cylindrical member divided by a plane including a center axis thereof, each body having a concentric semicylindrical recess extending along said axis for receiving a tubular member to be clamped.
    means concentric with said bodies for exerting a centripetal clamping force on said tubular member including a pair of reinforcing members formed of a harder material than that of said gripping bodies, each member having a bulged semicylindrical portion in concentric relation with one of said bodies and fillet-like side flanges integrally extending adjacent said plane from both side edges thereof, respectively, said bulged semicylindrical portion being concentric with said center axis and having a portion of greatest radius therefrom at a midpoint taken axially of the reinforcing member and portions of a smallest radius therefrom at points furthest from said midpoint in both axial directions, and
    means for connecting said pair of reinforcing members to each other with said bodies surrounding a tubular member clamped therebetween.

3. A device according to claim 2 in which the bulged semicylindrical portion of each reinforcing member is embedded in the resilient material of one of said gripping bodies.

* * * * *